(12) United States Patent
Hussain et al.

(10) Patent No.: US 11,243,227 B2
(45) Date of Patent: Feb. 8, 2022

(54) ANGULAR ACCELEROMETER DEVICE AND METHOD BASED ON CAPACITIVE SENSING

(71) Applicant: KING ABDULLAH UNIVERSITY OF SCIENCE AND TECHNOLOGY, Thuwal (SA)

(72) Inventors: Muhammad Mustafa Hussain, Hercules, CA (US); Wedyan Babatain, Thuwal (SA); Rishabh Mishra, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/153,377

(22) Filed: Jan. 20, 2021

(65) Prior Publication Data
US 2021/0223284 A1 Jul. 22, 2021

Related U.S. Application Data

(60) Provisional application No. 62/964,329, filed on Jan. 22, 2020.

(51) Int. Cl.
*G01P 15/125* (2006.01)
*G01P 15/08* (2006.01)
(Continued)

(52) U.S. Cl.
CPC .......... *G01P 15/125* (2013.01); *G01P 15/005* (2013.01); *G01P 15/02* (2013.01)

(58) Field of Classification Search
CPC ...... G01P 15/02; G01P 15/032; G01P 15/034; G01P 15/036; G01P 15/003; G01P 15/005
See application file for complete search history.

(56) References Cited

U.S. PATENT DOCUMENTS

| 4,866,850 A | * | 9/1989 | Kelly | G01C 9/06 33/366.22 |
| 5,627,316 A | * | 5/1997 | De Winter | G01C 9/10 200/61.45 R |
| 2002/0144548 A1 | * | 10/2002 | Cohn | G01P 15/125 73/514.16 |

FOREIGN PATENT DOCUMENTS

| DE | 102009055389 A1 | * | 8/2010 | .......... G01P 15/0802 |
| WO | WO-0104640 A1 | * | 1/2001 | .......... G01P 15/0922 |

OTHER PUBLICATIONS

Park, U., et al., "Development of a MEMS Digital Accelerometer (MDA) Using a Microscale Liquid Metal Droplet in a Microstructured Photosensitive Glass Channel," Sensors and Actuators A: Physical, Feb. 23, 2010, vol. 159, pp. 51-57, Elsevier B.V.

(Continued)

*Primary Examiner* — Jill E Culler
*Assistant Examiner* — Ruben C Parco, Jr.
(74) *Attorney, Agent, or Firm* — Patent Portfolio Builders PLLC

(57) ABSTRACT

An angular acceleration sensor includes a curved track having first and second metallic layers, and a spherical conductive ball provided within the track. The first metallic layer has a constant, uniform, width along a length of the track while the second metallic layer has a varying-width along the length of the track. An angular acceleration experienced by the spherical conductive ball is associated with a change in a capacitance between the spherical conductive ball and the curved track, which is uniquely associated with an external linear acceleration experienced by the sensor.

19 Claims, 13 Drawing Sheets

(51) Int. Cl.
*G01P 15/02* (2013.01)
*G01P 15/00* (2006.01)

(56) References Cited

OTHER PUBLICATIONS

Won, D.-J., et al., "Capacitive-Type Two-Axis Accelerometer with Liquid-Type Proof Mass," Advanced Electronics Materials, Apr. 14, 2020, vol. 6, 1901265, 12 pages, WILEY-VCH Verlag GmbH & Co. KGaA.

Zega, V., et al., "The First 3D-Printed and Wet-Metallized Three-Axis Accelerometer With Differential Capacitive Sensing," IEEE Sensors Journal, Oct. 15, 2019, vol. 19, No. 20, pp. 9131-9138, IEEE.

Zeng, H., et al., "Dynamic Behavior of a Liquid Marble Based Accelerometer," Applied Physics Letters, Mar. 18, 2010, vol. 96, pp. 114104-1-114104-3, American Institute of Physics.

Zhang, B., et al., "Self=Powered Acceleration Sensor Based on Liquid Metal Triboelectric Nanogenerator for Vibration Monitoring," ACS Nano, Jul. 3, 2017, vol. 11, pp. 7440-7446, American Chemical Society.

\* cited by examiner

ANGULAR ACCELEROMETER DEVICE AND METHOD BASED ON CAPACITIVE SENSING

CROSS-REFERENCE TO RELATED APPLICATIONS

This application claims priority to U.S. Provisional Patent Application No. 62/964,329, filed on Jan. 22, 2020, entitled "CYLINDRICAL TUBE AND ROLLING BALL BASED ACCELEROMETER FOR FALL DETECTION," the disclosure of which is incorporated herein by reference in its entirety.

BACKGROUND

Technical Field

Embodiments of the subject matter disclosed herein generally relate to a device and method for measuring an acceleration, and more particularly, to a capacitive based angular acceleration sensor that uses a moving mass inside a curved capacitor to determine the acceleration of a body.

Discussion of the Background

Motion and acceleration sensing are quantities desired in many applications such as consumer electronics, healthcare monitoring, buildings and structural monitoring, gaming, and many other applications. The most widely used acceleration and inertial sensors are those based on the established microelectromechanical systems (MEMS) technology. MEMS-based sensors are quite prevalent in the market due to their various attractive attributes such as small size, and large-scale production. The conventional fabrication methods of such systems usually incorporate suspended components such as beams and cantilevers and spring-like structures which compose the major elements of these systems.

The standard fabrication processes for such devices, however, impose many limitations such as process complexity, requirements of expensive and advanced fabrication facilities such as clean room, two dimensionality, and lack of customizability. In the recent years, new fabrication techniques have emerged in the sensors and actuators fields in order to address these shortcomings. Additionally, the used of intricate miniaturized silicon spring-like structures have been reported to experience mechanical fatigue over time, which led several researchers to try to compensate for this issue by improving the design and the packaging of the MEMS inertial sensors.

Thus, several researchers have developed inertial sensors with liquid metal droplets functioning as the proof mass [1-4]. Due to these reasons, several researchers are exploring new methodologies offering an alternative paradigm for manufacturing such systems. An example of such technology is 3D printing that can be used where complex and intricate 3D gematric capabilities and customizability of systems are of a greater interest than miniaturization and performance. Moreover, some of these recently developed sensors and actuators have shown excellent performance and are very promising [5].

Several examples of such 3D printed functional systems have been show in the literature to be inexpensive, process-effective, and offer high-flexibility and customizability. In recent years, the 3D printing has emerged as an innovative, highly-customizable, and inexpensive fabrication procedure for various sensors, including accelerometers and inertial motion sensors [5]. Utilizing 3D printing as a fabrication process combined with other inexpensive procedures and materials, could result in a simplified, affordable and customizable fatigue free acceleration sensor.

Thus, there is a need for manufacturing accelerometers that belong to a new class of versatile, customizable and low cost accelerometers.

BRIEF SUMMARY OF THE INVENTION

According to an embodiment, there is an angular acceleration sensor that includes a curved track having first and second metallic layers, and a spherical conductive ball provided within the track. The first metallic layer has a constant, uniform, width along a length of the track while the second metallic layer has a varying-width along the length of the track, and an angular acceleration experienced by the spherical conductive ball is associated with a change in a capacitance between the spherical conductive ball and the curved track, which is uniquely associated with an external linear acceleration experienced by the sensor.

According to another embodiment, there is an acceleration measuring system that includes an angular acceleration sensor configured to measure a linear acceleration, a processing and communication unit electrically connected to the angular acceleration sensor and configured to read an equivalent capacitance of three different capacitors (C1 to C3) of the angular acceleration sensor, and a power supply configured to supply power to the processing and communication unit.

According to yet another embodiment, there is a method for determining a linear acceleration. The method includes applying a linear acceleration to an angular acceleration sensor, wherein the angular acceleration sensor includes a curved track having first and second metallic layers, allowing a spherical conductive ball, which is provided within the track, to freely move inside the track due to inertia, measuring an equivalent capacitance formed by three different capacitors (C1 to C3) of the angular acceleration sensor, and calculating the linear acceleration experienced by the angular acceleration sensor based on the measured equivalent capacitance. The first metallic layer associated with the second and third capacitors has a constant, uniform, width along a length of the track while the second metallic layer associated with the first and third capacitors has a varying-width along the length of the track.

BRIEF DESCRIPTION OF THE DRAWINGS

Fora more complete understanding of the present invention, reference is now made to the following descriptions taken in conjunction with the accompanying drawings, in which:

FIGS. 1A to 10 are schematic diagrams of an angular acceleration sensor that uses a variable width metallic layer to determine a change in a capacitance that is associated with the angular acceleration;

FIG. 2 is an electrical diagram that illustrates the connections between the three capacitors that form the angular acceleration sensor;

FIG. 4 is an overview of the elements that form the angular acceleration sensor and how they are arranged relative to each other;

FIG. 5 illustrates a track formed to contain within a spherical mass that moves based on the angular acceleration experienced by the sensor;

FIG. 6 shows an actual angular acceleration sensor built based on the elements shown in the figures above;

FIG. 7 illustrates how the angular acceleration sensor and various other components are attached as a system to a moving object for determining its angular acceleration;

FIG. 8 is a flow chart of a method for making the angular acceleration sensor shown in the figures;

FIG. 9 is a graph that plots the change in the capacitance of the angular acceleration sensor versus the experienced angular acceleration;

FIG. 100 illustrates the relation between the equivalent capacitance of the angular acceleration sensor and the time for various sizes of a spherical mass that moves within the angular acceleration sensor.

DETAILED DESCRIPTION OF THE INVENTION

Figure 1A:
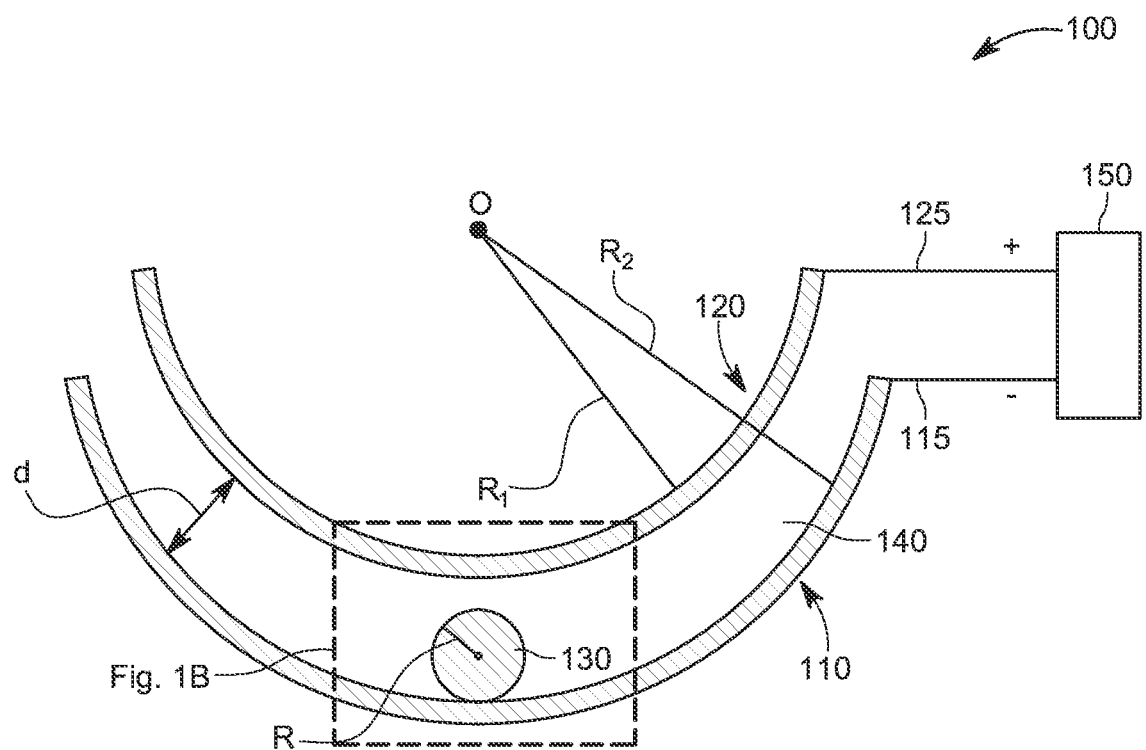

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a 3D printable angular accelerometer sensor that uses a spherical metallic ball inside a curved capacitor for determining the acceleration of an object to which the sensor is attached to. However, the embodiments to be discussed next are not limited to a 3D printed system, or to a spherical metallic ball, but may be applied to other systems.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel angular acceleration sensor utilizes a conductive sphere as the proof mass, and the spherical mass is enclosed inside a copper patterned semi-circular track. The upright position of the semi-circular track imposes a restoring force (the gravity) on the spherical mass, allowing for continuous angular acceleration monitoring. The sensor relies on a capacitive transduction mechanism that employs a varying-width metallic layer, which allows for capturing the motion of the spherical mass along the entire length of the track using a singular reading, thus minimizing power consumption, and fabrication complexities. Performance characteristics of the sensor such as the sensitivity, acceleration amplitude range, and frequency range were analyzed by using a vibration stage with a custom-built rotary fixture. When an acceleration was applied at a 11H frequency and amplitude of 0.0 g, the sensor showed a sensitivity ~73 fF/g. Acceleration profiles of vibrations with a frequency range of 8 Hz to 14 Hz and acceleration amplitudes as low as 0.1 g were detected by the developed sensor. Thus, the proposed angular accelerometer contributes towards the development of an emerging class of innovative design and fabrication processes for excellent-performance, customizable, and low-cost electromechanical devices. The developed sensor was integrated with a programmable system on a chip and battery unit enabling it to function as a stand-alone system. The details of this sensor and the associated system are now discussed with regard to the figures.

The angular acceleration in this application refers to the time rate of change of an angular velocity of an object. The angular velocity refers to how fast an object rotates or revolves relative to an axis or a point, i.e., how fast the angular position or orientation of the object changes with time. Thus, in this application, whenever an object rotates relative to a point, it has an angular velocity, and a change in time of that angular velocity results in an angular acceleration. An angular acceleration sensor may be placed on an object and determines the linear acceleration of that object.

FIG. 1A illustrates an angular acceleration sensor 100 that has a first curved plate 110, a second curved plate 120 facing the first curved plate 110, and a spherical mass 130 that is placed between the first and second curved plates 110 and 120. A distance between the first and second curved plates 110 and 120 is d, which is larger than the diameter 2R of the spherical mass 130. Note that in one application the distance d is measured between the internal face of the first curved plate (which corresponds to a dielectric layer in this embodiment, as discussed later) and the internal face of the second curve plate (which corresponds to another dielectric layer as discussed later). Thus, the spherical mass 130 can freely move between the first and second curved plates. The diagram shown in FIG. 1A illustrates the spherical mass 130 being in a stationary state, i.e., stable equilibrium.

Figure 1B:
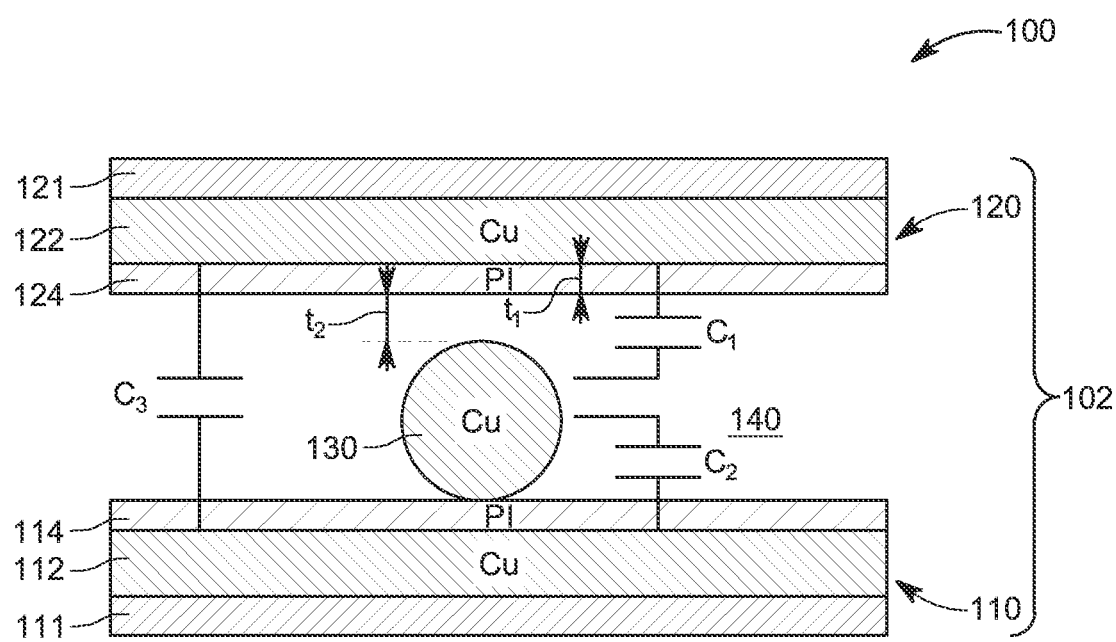
Figure 1C:
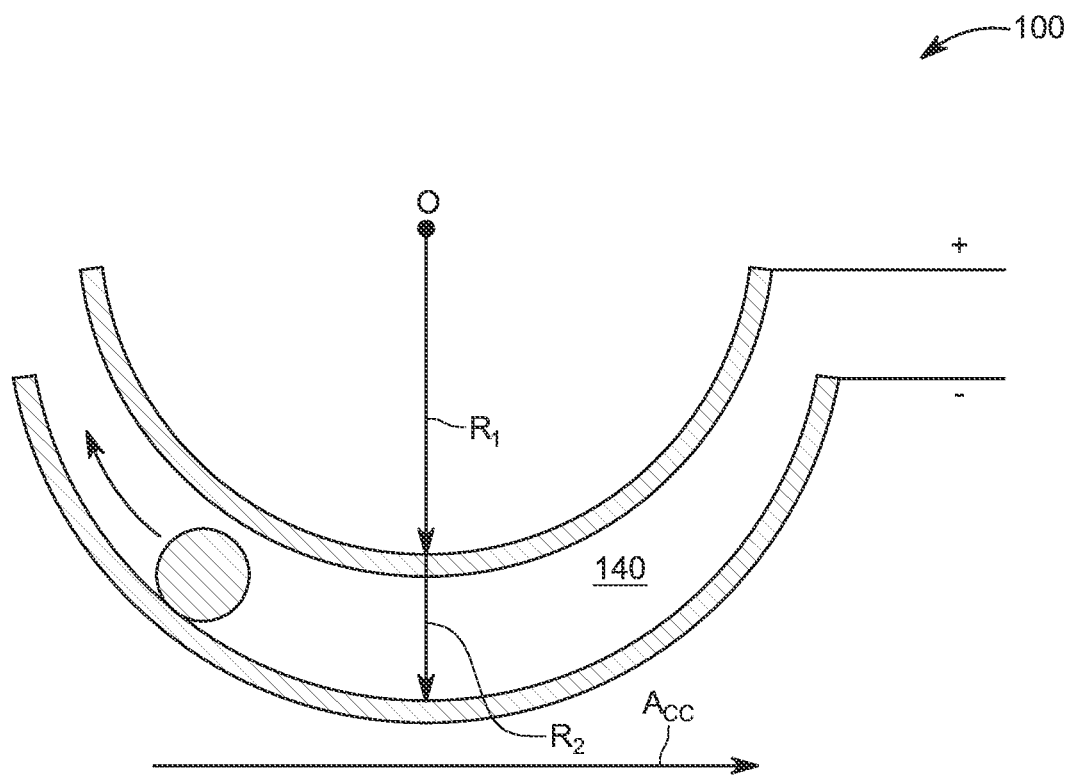

FIG. 1B shows in more detail the structure of the first and second curved plates 110 and 120, and also the actual capacitances established between the curved plates and the spherical mass. FIG. 1B shows that the first curved plate 110, also called herein the outer plate (with regard to a central point O) includes a support layer 111, for example, made of an insulator material (plastic or polymer), a metallic layer 112, for example, made of copper, and a dielectric layer 114 that covers the metallic layer 112, for example, made of a polymer polyamide (PI). In one application, the metallic layer 112 may be located directly over the support later 111, and the dielectric layer 114 may be located directly over the metallic layer 112.

The figure also shows that the second curved plate 120 includes a support layer 121, made of an insulator material (plastic or polymer), a metallic layer 122, for example, made of copper, and a dielectric layer 124 that covers the metallic layer 122, for example, made of PI. These layers may be located directly over each other as discussed above with regard to the first curved plate. The space between the dielectric layers 114 and 124 is partially filled with air and with the spherical mass 130. The spherical mass 130 may also be made of Cu. The first and second curved plates 110 and 120 form a parallel plate capacitor 102.

However, the capacitor 102 is not a traditional capacitor that has the areas of the metallic plates or layers equal to each other. In this embodiment, a modified capacitive sensing mechanism is used that employs the concept of fixed-area and varying-area electrodes. Further, because the spherical mass 130 is used as the proof mass, it eliminates complications that might arise from the fabrication of suspended components and minimizes mechanical fatigue. In one implementation, 3D printing is utilized for forming the first and second plates as an innovative, high-customizable and cheap fabrication, which will reduce the fabrication complexity and cost of the overall device.

In one embodiment, the spherical mass 130 resides between the first and second curved plates, which may be semi-circular, thus forming a ring-like track 140. The radius R of the spherical mass 130 could be in this embodiment 1.2 mm while the radius R1 of the inner curved plate 120 is 16 mm, and the radius R2 of the outer curved plate 110 is 20 mm, when measured from the center O of the circle. The first and second curved plates 110 and 120 may form an exact half of a circle, and the two curved plates are mounted to be concentric to each other so that the annular space or track 140 formed by them has a constant width d. The track 140 can be fully closed, as discussed later. In this embodiment, each metallic layer has a thickness of 35 μm and a width of 1 mm. The metallic layers may be covered with a 25 μm layer of polyamide (PI) tape. The polyamide is being used as the dielectric layer to insulate the conductive copper layers from the conductive spherical mass 130. The PI material also acts as a protection layer for copper to prevent its corrosion over time. All these dimensions are provided to enable one skilled in the art to make this sensor. However, one skilled in the art would understand, based on the teachings herein, that other values may be used. While FIG. 1A shows the sensor 100 having the spherical mass 130 at rest, FIG. 10 shows the sensor 100 being exposed to an external linear acceleration Acc, which makes the spherical mass 130 to move to the opposite direction, due to the inertia, to a non-equilibrium position. It is also noted that due to the curved track 140, the spherical mass 130 experiences an angular acceleration, which is correlated to a change in capacitance of a capacitor formed by the track. The angular acceleration experienced by the spherical mass 130 also correlates to the linear acceleration applied to the sensor. Thus, by mapping the change in the capacitance of the track 140 due to the angular motion of the spherical ball within the track, it is possible to estimate the linear acceleration applied to the track.

Figure 2:
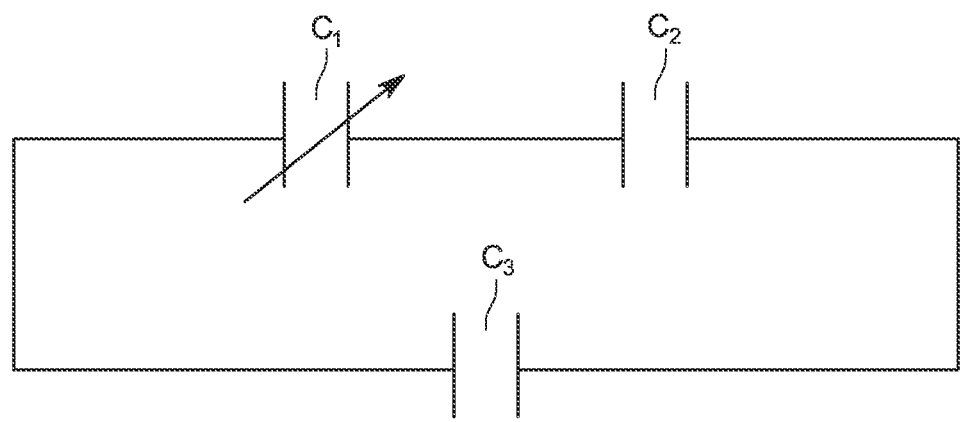

The combination of the first and second curved plates 110 and 120 and the spherical mass 130 determine the capacitor 102 to have an equivalent capacitance $C_{eq}$, which includes three different capacitances C1 to C3, as illustrated in FIGS. 1B and 2. The first capacitance C1 is formed between the inner plate 120 and the spherical mass 130, the second capacitance C2 is formed between the outer plate 110 and the spherical mass 130, and the third capacitance C3 is formed between the first and second curved plates 110 and 120. The first capacitance C1 is variable, i.e., it changes as the spherical mass 130 moves along the track formed by the first and second curved plates 110 and 120, while the second capacitance $C_2$ and the third capacitance C3 are fixed. This is schematically illustrated in FIG. 2. Note that the spherical mass 130 is in direct contact with the dielectric layer 114, which has a thickness $t_2$, of the outer plate 110, while a layer of air of thickness $t_2$ is present between the spherical mass 130 and the dielectric layer 124 of the inner plate 120. This is so to allow the spherical mass 130 to freely move between the inner and outer curved plates 110 and 120. The two curved plates 110 and 120 are electrically connected by leads 115 and 125 to an electronic device 150, which may be a power source combined with a current detector or any other device that is capable of supplying a voltage to the inner and outer curved plates and also to measure a capacitance between these two curved plates.

Figure 3A:
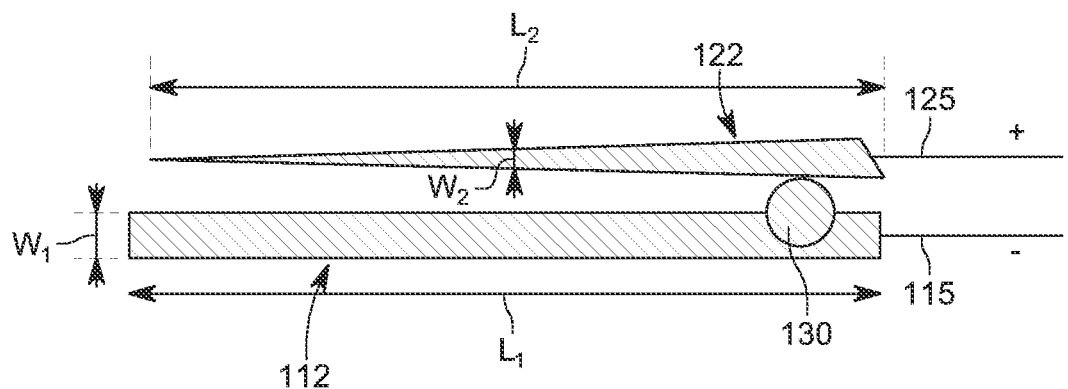
FIGS. 3A to 3C illustrate a variable width metallic layer, a constant width metallic layer, and a spherical mass that form the angular acceleration sensor and the relative positions of these elements.
Figure 3B:
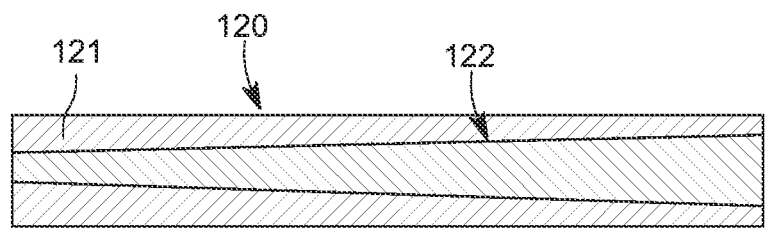
Figure 3C:
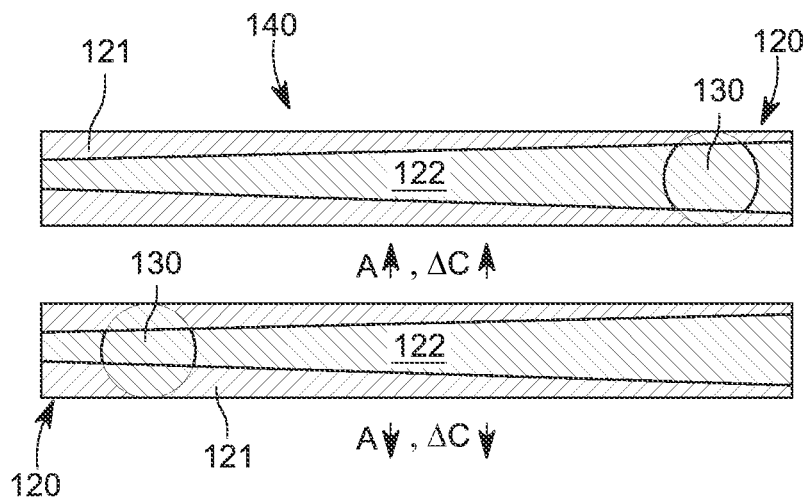

The shape of the first and second support layers 111 and 121, and those of the first and second metal layers 112 and 122 are shown in more details in FIGS. 3A to 3C. FIG. 3A shows the metal layers 112 and 122 sandwiching the spherical mass 130 and FIG. 3B shows the metal layers 112 and 122 being formed on corresponding support layers 111 and 121, respectively. It is noted that the support layer 111 and the metal layer 112 are rectangular, having a constant width W1 along the length L1 of the support layer 111. In this embodiment, the two layers have identical sizes and shapes. However, the width W2 of the second metal layer 122 varies along its length L2, as the shape of the second metal layer 122 is triangular while the corresponding support layer 121 is rectangular, as shown in FIG. 3B. In this embodiment, L1=L2, and the maximum width of the second metal layer 122 is equal to the width of the first metal layer 112 while the two support layers 111 and 121 may have identical widths. However, these sizes can vary. FIG. 3B shows not only the sizes and shapes of the first and second metal layers 112 and 122, but also the sizes and shapes of the corresponding first and second support layers 111 and 121 and the first and second plates 110 and 120. It is noted that the size and shape of the first curved plate 110 coincides with those of the first support layer 111 and the first metal layer 112 while the situation is different for the second curved plate 120 and the second metal layer 122 as the second curved plate 120 and the second support layer 121 are rectangular and the second metal layer 122 is triangular. In one embodiment it is possible that the curved plates 110 and 120 are reversed, i.e., the first curved plate is the inner plate and the second curved plate 120 is the outer plate. FIG. 3C shows the spherical mass 130 being placed at various positions along the second plate 120, and how the common area A between the spherical mass 130 and the second metal layer 122 changes, proportional to the change in the capacitance of the capacitor $C_1$ formed by the spherical mass and the second curved plate.

Figure 4:
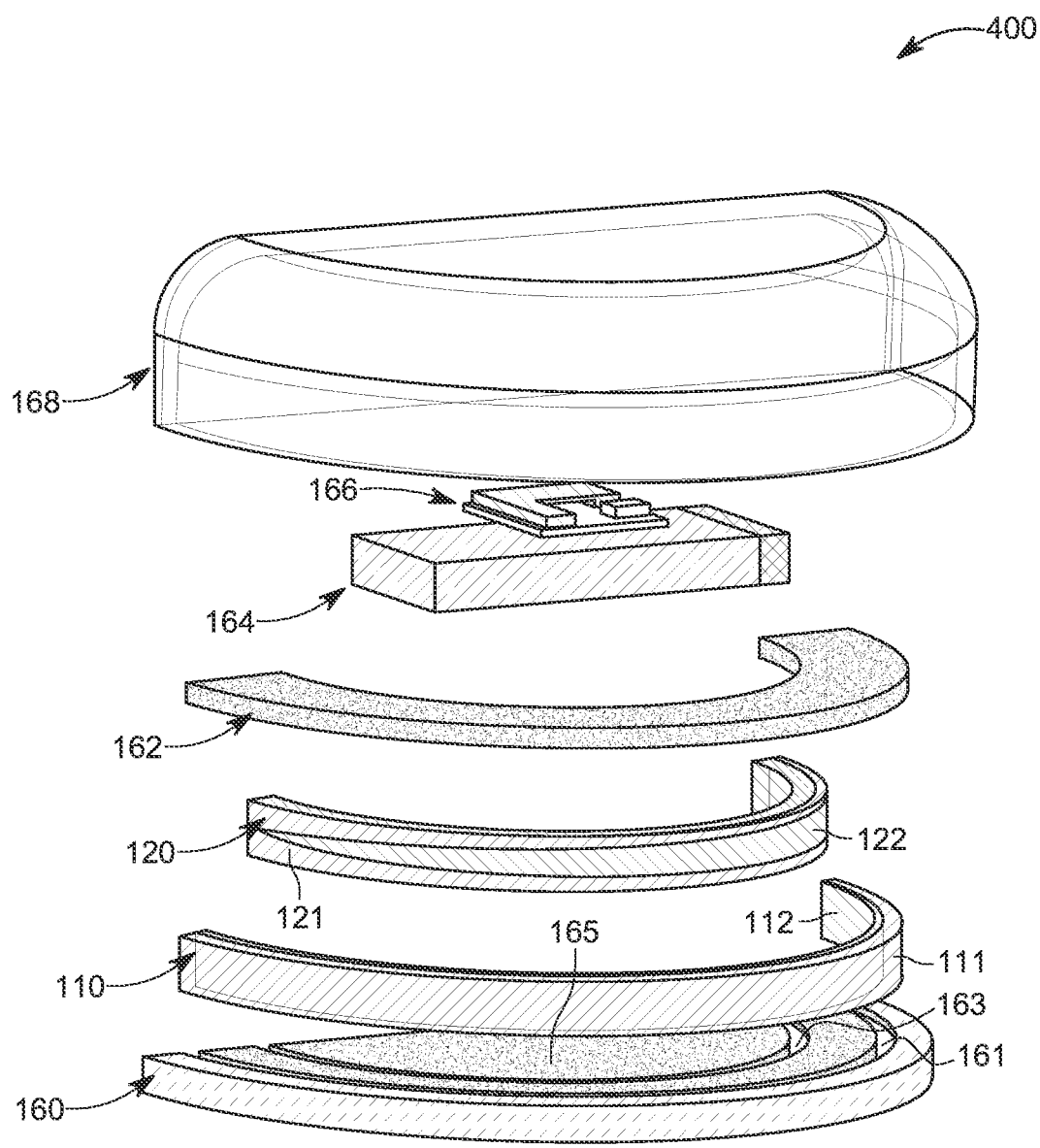

To prevent the spherical mass 130 from leaving the space between the first and second curved plates 110 and 120, i.e., the track 140, in one embodiment, a half ring-shaped base 160 and a half ring-shaped cover 162 are used to close the track, as shown in FIG. 4. Thus, the first and second curved plates 110 and 120, the base 160 and the cover 162, when placed together, fully enclose the track 140. For this embodiment, the track 140 is fully closed. The length of the track 140 can be curved to have a semi-circular shape, as shown in FIGS. 1A and 10, but also may be curved to follow another well-defined shape. In one embodiment, a length of the track 140 may be less or more than the length of a semi-circle. Note that a semi-circular track is considered to have a half of a length of the circumference of the circle that corresponds to that track.

The base 160 and/or the cover 162 may be metallized toward the track 140, for example, with copper, when connecting the two curved plates 110 and 120, so to fully encapsulate the spherical mass 130 to ensure that the ball not only stays inside the tunnel formed by these four elements, while holding the sensor 100 in its upright position, but also to reduce outside noise. The metallized base and cover may be grounded to be used as a shielding electrode, to reduce the noise coming from nearby objects. In one application, the base 160 may be 3D printed with a polymer or similar material and may be configured to have two grooves 161 and 163, as shown in FIG. 4, and the grooves are sized to receive the first and second curved plates 110 and 120, respectively.

Figure 5:
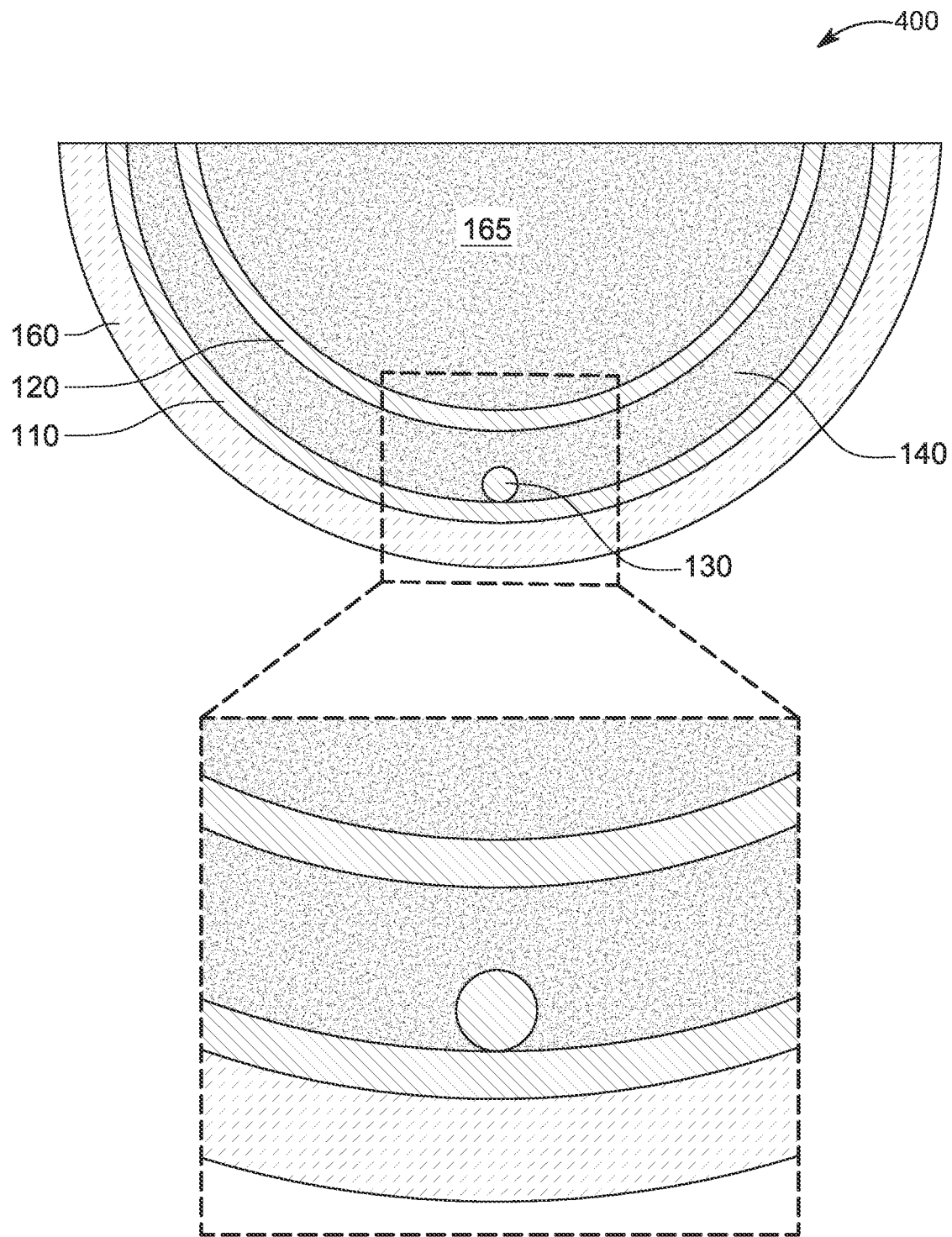
Figure 6:
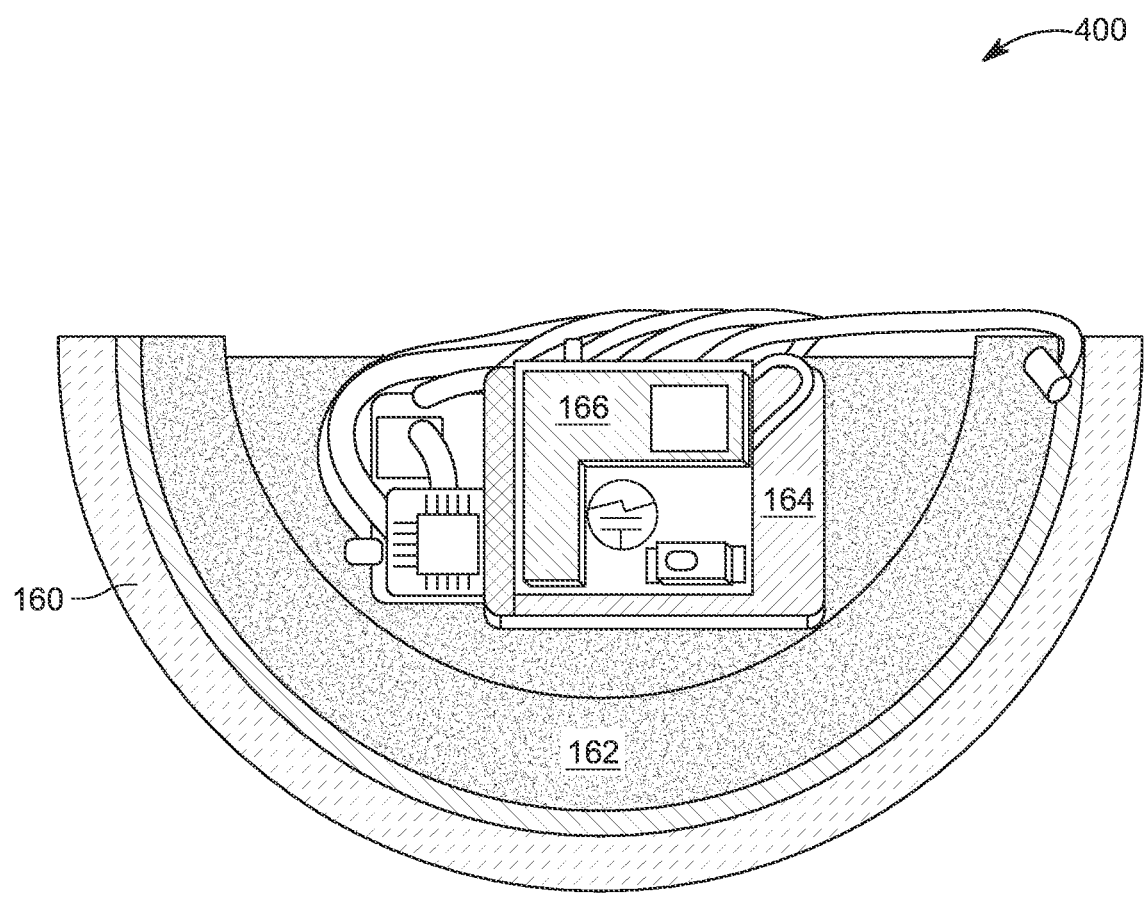

The base 160 having the first curved plate 110 and the second curved plate 120 are shown in more detail in FIG. 5. This figure also shows the spherical mass 130 positioned between the two plates. It is noted that the central part 165 of the base 160 is free of the two plates. Thus, in this region, as shown in FIG. 5, a power unit 164 (e.g., a battery) and a processing and communication unit 166 are placed to form an angular acceleration measuring system 400, which is also shown in FIG. 6. FIG. 6 also shows the cover 162 covering the first and second curved plates 110 and 120 to close the track 140. A final top case 168 can be placed all over these elements to seal them from the outside, as shown in FIG. 4. The top case 168 may be 3D printed from a polymer and may be configured to directly contact the base 160 so that all the elements are sealed inside.

The metallic layers 112 and 122 are used to continuously measure the angular acceleration of the spherical ball 130 by determining the change in the equivalent capacitance of the combined three capacitors $C_1$ to $C_3$ as the spherical mass moves along the track defined by the first and second curved plates 110 and 120. Thus, the spherical mass acts 130 in this embodiment as a floating electrode.

The capacitance change of a parallel plate capacitor configuration is given by equation (1)

$$\Delta C = \frac{\varepsilon_0 \varepsilon_r \Delta A}{D} \quad (1)$$

where $\Delta C$ is the capacitance change, $\varepsilon_0$ is the vacuum permittivity, $\varepsilon_r$ is the dielectric constant, $\Delta A$ is the change in the overlapping area between the spherical mass and the metallic layer 112 or 122, and D is the thickness of the dielectric layer, which can be only the PI layer or a combination of the PI layer and the air gap between the PI layer and the spherical mass. As mentioned previously, the presence of the conductive spherical mass between the top and bottom plates results in three different capacitors C1, C2 and C3. Thus, the overall equivalent capacitance of the sensor 100 is given by equation (2):

$$C_{eq} = \frac{1}{C_1} + \frac{1}{C_2} + C_3 \quad (2)$$

The second capacitance $C_2$, between the spherical mass and the first metallic layer 112 is given by:

$$C_2 = \frac{\varepsilon_0 \varepsilon_{PI} A_2}{d_{PI}}, \quad (3)$$

where $A_2$ is the common area between the spherical mass 130 and the first metallic layer 112, which is the largest cross-sectional area of the spherical mass.

The first capacitance C1, between the spherical mass and the second metallic layer 122, is given by a first term $C_1'$, which corresponds to the dielectric layer 124 having the thickness $t_1$, and a second term $C_1''$, which corresponds to the air layer having the thickness $d-2R$, and can be written as:

$$\frac{1}{C_1} = \frac{1}{C_1'} + \frac{1}{C_1''} \quad (4)$$

where the first term is given by:

$$C_1' = \frac{\varepsilon_0 \varepsilon_{PI} A_1}{t_1} \quad (5)$$

and the second term is given by:

$$C_1'' = \frac{\varepsilon_0 \varepsilon_{Air} A_1}{d-2R}, \quad (6)$$

where $A_1$ is the common area between the spherical mass and the second metallic layer 120. Note that the area $A_1$ varies as the spherical mass moves along the track 140 as the width of this layer varies due to its triangular shape.

Therefore, the capacitance of the capacitor $C_1$ is given by:

$$C_1 = \frac{\varepsilon_0 \varepsilon_{Air} \varepsilon_{PI} A_1}{\varepsilon_{Air} t_1 + \varepsilon_{PI}(d-2R)}. \quad (7)$$

To continuously sense the angular acceleration of the spherical mass 130 within the semi-circular track 140, the varying-width metallic layer 120 plays an important role, as the common area $A_1$ between the spherical mass 130 and the second metallic layer 122 changes as the ball moves inside the track 140, and thus, the angular acceleration of the mass 130 can be uniquely identified with a corresponding capacitance change, as discussed above. In one application, the width of the second metallic layer 122 varies uniformly, i.e., with a constant slope. However, the width can vary differently, i.e., in a non-uniform manner. Unlike previous proposed designs of similar systems, which employ resistive configurations, the varying-width metallic layer is used to achieve the same results. It is noted that previous sensors that used resistive structures to determine the position of the mass when rolling over a curved channel, used the ball to connect or disconnect two electrodes of a plurality of electrodes from a given circuit, and thus, the mass was acting as an electrical switch. Thus, in the previous sensors, the position of the mass was sensed by determining which two electrodes are connected. Each electrode was fed to a separate digital pin in a microcontroller. These structures require the use of many pins, consumes more power and lacks sensitivity and resolution sense as not the whole track can be completely covered with electrodes due to power-limitation.

Choosing the spherical mass in the sensor 100 to be composed of a conductive material is advantageous as it will contribute to the overall capacitance value, which increases the overall signal variations being detected. Further, the parallel-plate capacitor electrode configuration shown in FIGS. 1A to 10 allows for capturing the movement of the sphere over the entire track by relating it to an angular capacitance reading and minimizing power consumption and system complexity. In this regard, as illustrated in FIG. 3C, as the spherical mass 130 moves to the right edge of the track 140, the active overlapping area between the second metallic layer 122 and the spherical mass 130 increases, which leads to an overall increase in the capacitance change $\Delta C$ according to equation (1). On the other hand, as the spherical mass 130 moves towards the left edge of the track 140, the active overlapping area between the second metallic layer 122 and the spherical mass 130 decreases, leading to an overall decrease in the capacitance change $\Delta C$. This continuous variation in the capacitance introduced by this configuration is used to map and capture the movement of the spherical mass 130 along the track 140 while minimizing the number of electrodes (only two are necessary for measuring the change in the capacitance) used to track the spherical mass.

Figure 7:
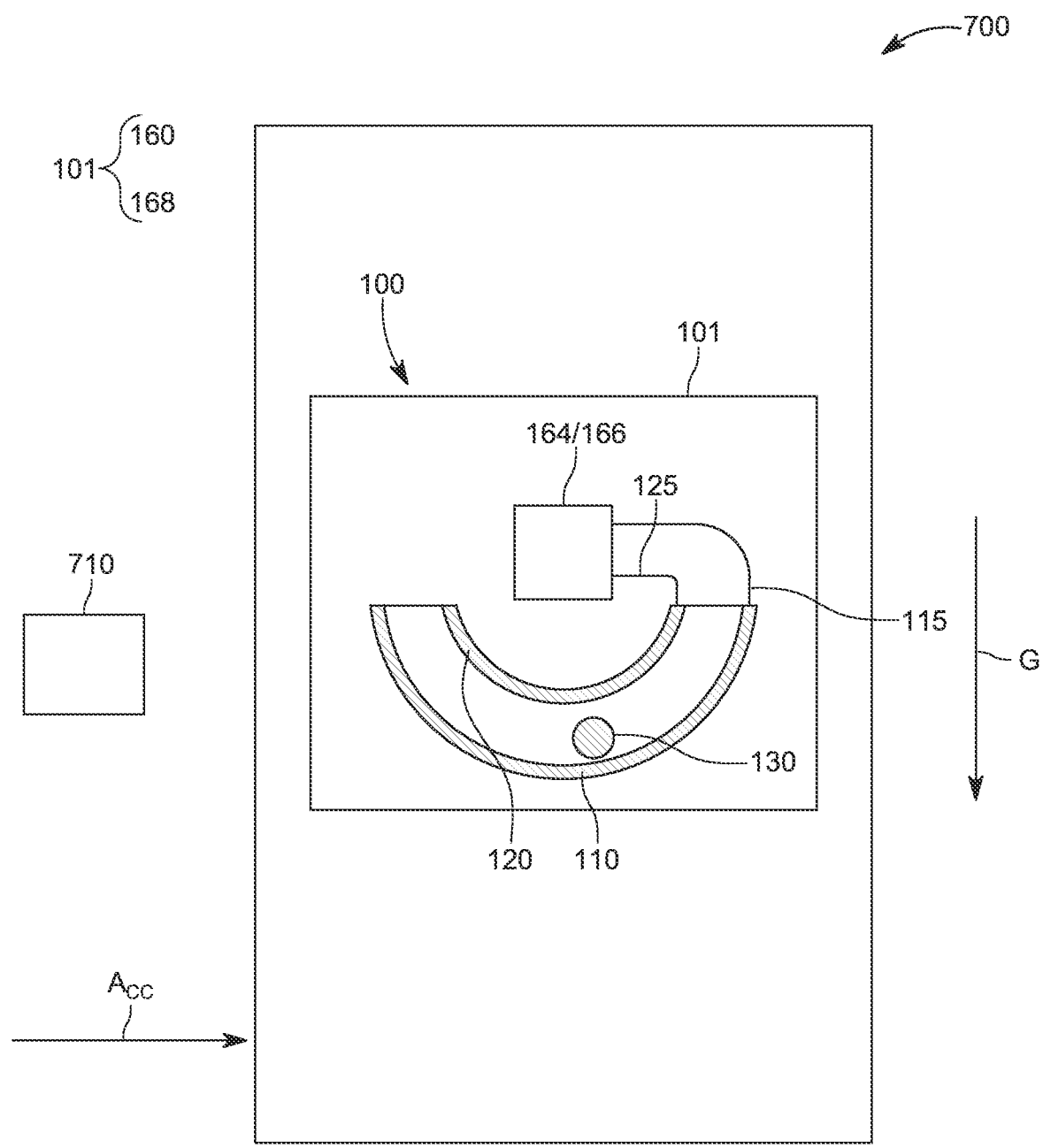
Figure 8:
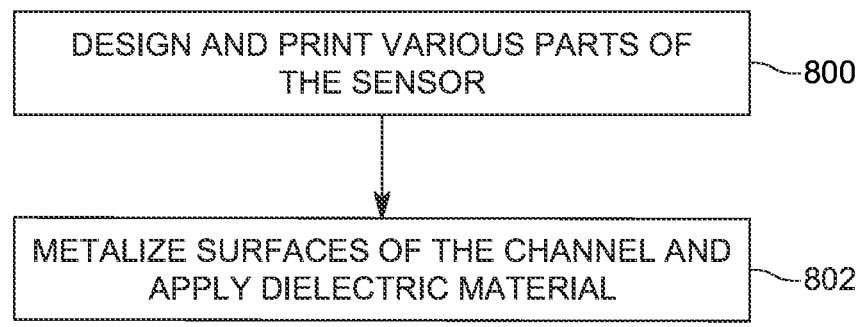

Thus, the operating principle of the sensor 100 requires the sensor to be fixed to an object 700, as shown in FIG. 7, and when an external linear acceleration Acc is applied to the right on the object 700, inertial forces on the spherical mass 100 causes it to roll over the curved channel (as shown in FIG. 10) containing the metallic layers 112 and 122. The external acceleration is reflected by the movement profile of the mass, which is detected by the electrodes 115 and 125. As the spherical mass 130 rolls over the curved channel 140, it will change the capacitance $C_1$. Thus, the angular acceleration of the mass 130 is sensed by determining the change in the overall capacitance $C_{eq}$. Because of the position of the sensor 100 on the body 700, i.e., the first curved plate 110 is located below the second curved plate 120 along the gravity (or vertical) G, it enables the gravity to act on the mass 130 as a restoring force, allowing for continuous measurements. Movement of the mass 130 from one end of the track 140 to the other end correlates with the external linear acceleration applied to the object.

There is some analogy of the mechanism of the sensor 100 in relation to the operating mechanism of the conventional MEMS-based accelerometer. The spherical mass is acting as the proof mass of the MEMS accelerometer, and the gravity acts in place of the spring, which restores the proof mass to its original state when no external acceleration is being applied. The angular displacement of the spherical mass indicates the direction and magnitude of the externally applied acceleration.

To extract the capacitance data, the sensor 100 may implement the processing and communication unit 166 as a Programmable System-on-Chip (PSoC) with a Bluetooth transceiver, which is capable to capture and transfer in real-time capacitive readings between the first and second curved plates 110 and 120. The unit 166 is thus connected to electrodes 115 and 125, as illustrated in FIG. 7, for implementing this functionality. Moreover, the power unit 164 of the sensor 100 may be implemented as a rechargeable lithium-ion battery. Both the battery and the PSoC are enclosed inside the 3D printed housing 101, which includes the base 160 and the top cover 168. To extract the linear acceleration of the sensor 100 as an output, the PSoC 166 was chosen for its built-in capacitance (CapSense) sensing elements, eliminating the need for external integrated circuit (IC) other than the PSoC. An algorithm can take readings from the sensor, determine the change in capacitance, map the change in capacitance to the applied linear acceleration, and transfer these results or the raw data via Bluetooth to a nearby computing device or smart phone 710 for further analysis.

The sensor 100 can be fabricated using one of a plurality of technologies. One technology, which is believed to lower the price of the sensor to become inexpensive for many applications is now discussed and is based on a two-step process where an efficient fabrication method using 3D printing technology and copper tape is used. Owning to its inexpensive features, the 3D printing has been chosen as the main fabrication method of the sensor. In one embodiment, a commercial 2.8 mm diameter ball was integrated with the sensor. In one application, the mass 130 can also be 3D printed and metallized using a certain protocol for metallization of 3D printed parts such as electroplating.

The method starts in step 800 (see FIG. 8) with designing the various parts of the sensor using a commercially available software, for example, computer-aided design (CAD) software SolidWorks. The 3D CAD data were converted and sliced into layers and then saved in a format that is compatible and widely used in most commercial 3D printers. After that, the designed parts were printed using available materials and printers, for example, VisiJet M2R-WT ABS-like material and ProJet 2500 printer. The 3D structures were cleaned using an ease clean system of the printer to remove the structural wax supporting layers. Additional cleaning was performed by washing the 3D printed structure with soapy water and immersing in isopropyl alcohol (IPA) bath and sonicated for 10 minutes to ensure the complete removal of any wax residues.

The next step 802 is to selectively metalize some parts (support layers 111 and 121) to obtain the first and second metallic layers 112 and 122, and also the base 160 and the cover 162. In this embodiment, a pre-cut conductive copper tape of 3 mm width and 2 μm thickness was placed over predefined locations on the 3D printed structures 111 and 121 to create the metallic layers 112 and 122. The VisiJet M2R-WT ABS-like material was chosen for its mechanical proprieties such as its rigidity and stability as well as its biocompatibility since it can be used for many medical applications. Copper for the metallic layers and the spherical mass was chosen as the primary material for its good conductivity and flexibility among other commonly used metals and also its cost effectiveness. Polyimide was chosen as the insulating dielectric material for the dielectric layers 114 and 124 for its desirable properties such as thermal stability, long-term stability, and low manufacturing cost. To facilitate the patterning of the fixed-width and the varying-width, the first and second metallic layers 112 and 122 were printed separately than the support layers 111 and 121. The base 160 was designed with intruded grooves 161 and 163, which allow the support layers 111 and 121 to easily interlock into the base after pattering.

The laser-precut copper tape was placed over the support layers 111 and 121 to form the top and bottom capacitor plates. Also, the base 160 and the track cover 162 may be completely metallized with copper to be used as grounded shielding planes to minimize noise from nearby objects. Each copper metalized face was covered and protected with a 25 μm Polyimide tape to achieve the dielectric layers 114 and 124. In this regard, FIG. 4 shows all of these components being housed and packaged inside the 3D printed top case 168, which can also be fully metalized with copper on its inside, to act as an additional grounded shielding plane. Integrating all these components within the sensor enables it to be used as a stand-alone system without the need for external processing and communication units.

In order to characterize the performance of the sensor and extract its characteristics, an actual sensor was mounted onto a vibration exciter. The exciter is connected to a signal generator and a power amplifier enabling it to generate sinusoidal vibrations with controlled frequency and acceleration. The system was mounted on a custom made polymer stage and exposed to various angular accelerations. The data of the angular displacement and acceleration of the mass 130 along the curved channel 140 is transferred to a nearby computing device 710 using the Bluetooth communication device 164, for analysis.

Figure 9:
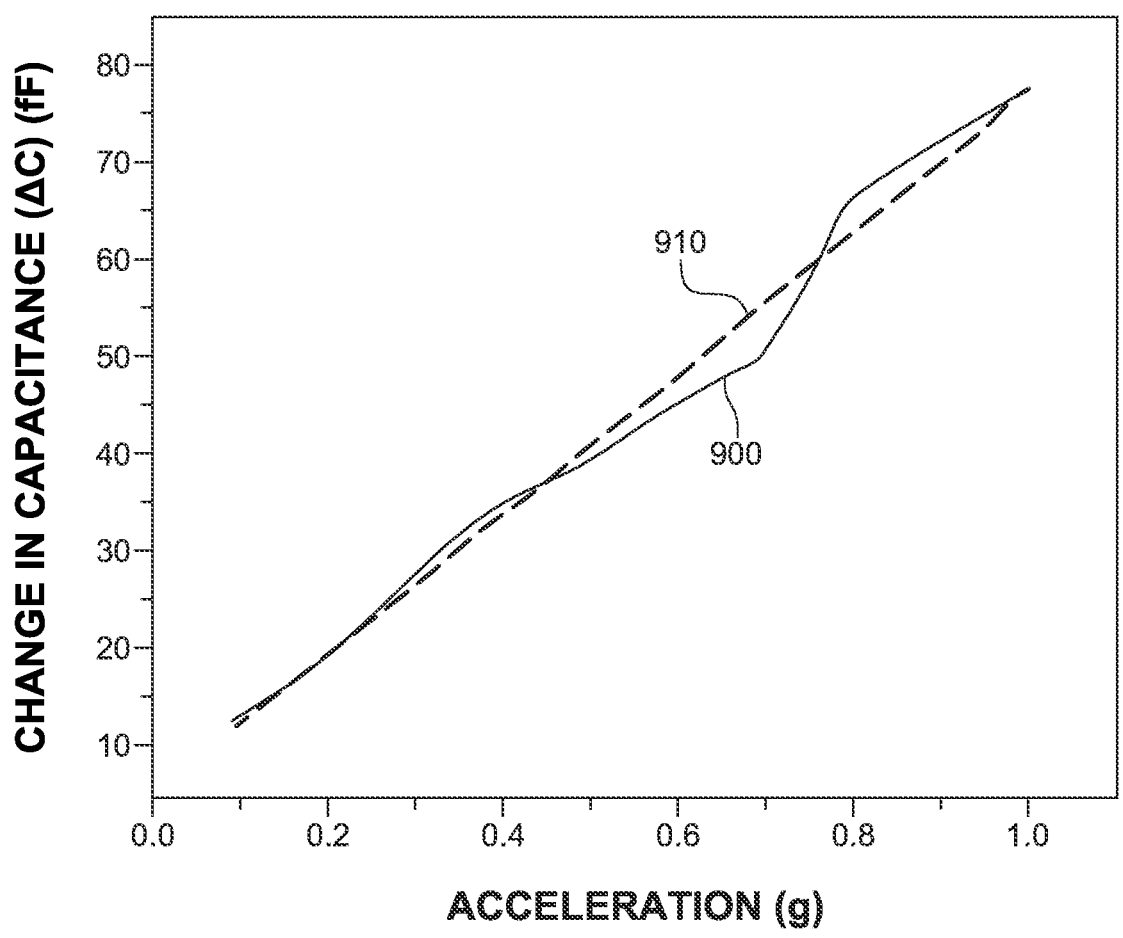

The sensor discussed above has been subjected to a vibration testing. The acceleration applied to the sensor was controlled by the signal generator. The PSoC 166 was used to read and communicate the capacitance variations of the sensor to the computer 710 in real-time. Accelerations ranging from 0 to 1 g were applied to the sensor 100 in the horizontal direction enabled by rotating the custom-built metal fixture that holds the sensor. The capacitance variations ΔC corresponding to the applied linear acceleration were captured and plotted against different amplitudes as indicated in FIG. 9 by curve 900, and a linear fit 910 was determined. The response of the accelerometer 100's output capacitance is plotted against the applied acceleration's amplitude in FIG. 9. The sensor showed a sensitivity of 73 fF/g, which was determined from the slope of the linear response 910 of the sensor (capacitance change over acceleration change) when a range of acceleration was applied at a frequency of 10 Hz. These acceleration and frequency ranges were chosen based on an intended application of the sensor, which in this case is human motion monitoring applications.

Figure 10A:
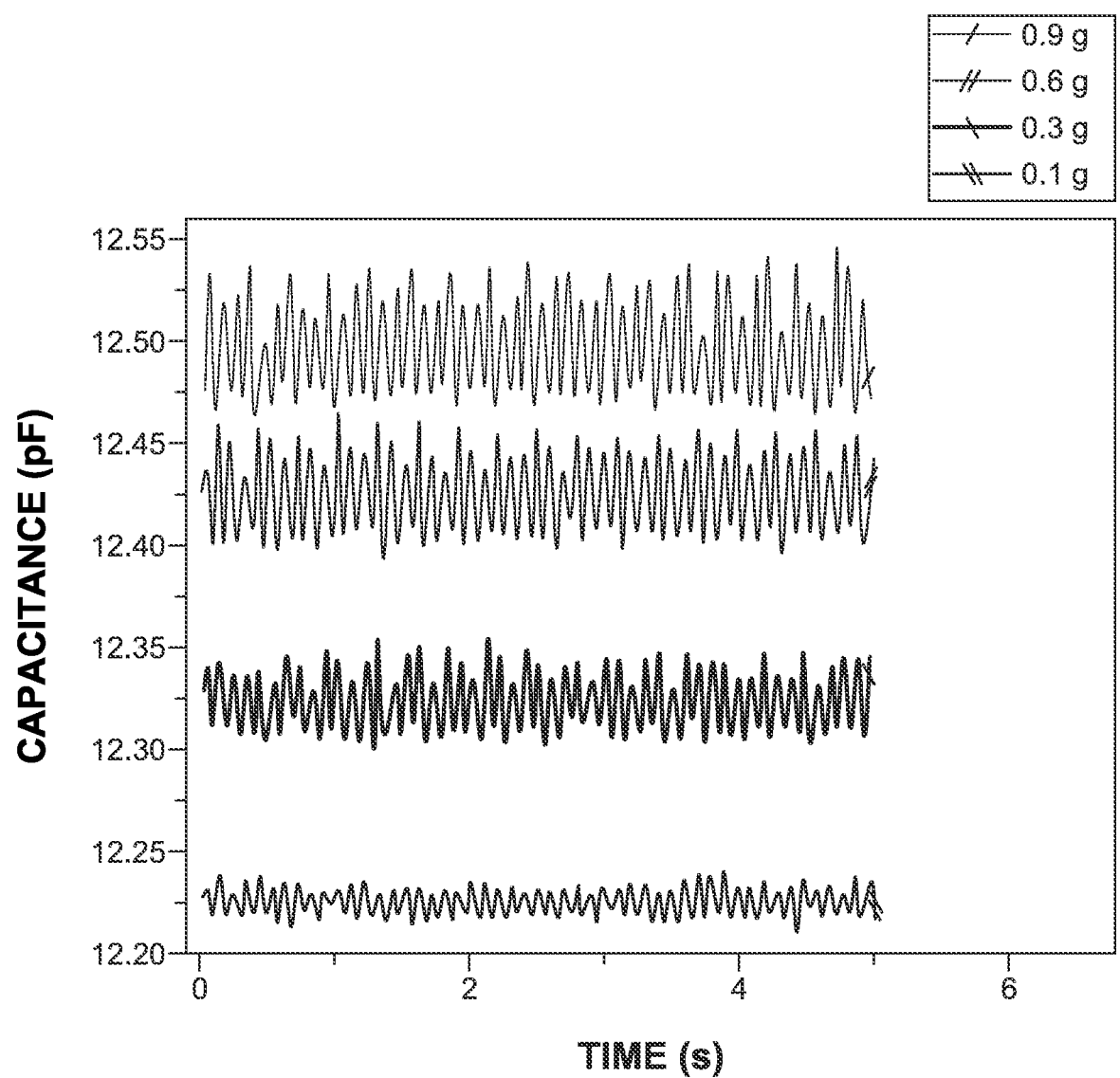
FIG. 10A illustrates the relation between the equivalent capacitance of the angular acceleration sensor and the time for various angular accelerations.
Figure 10B:
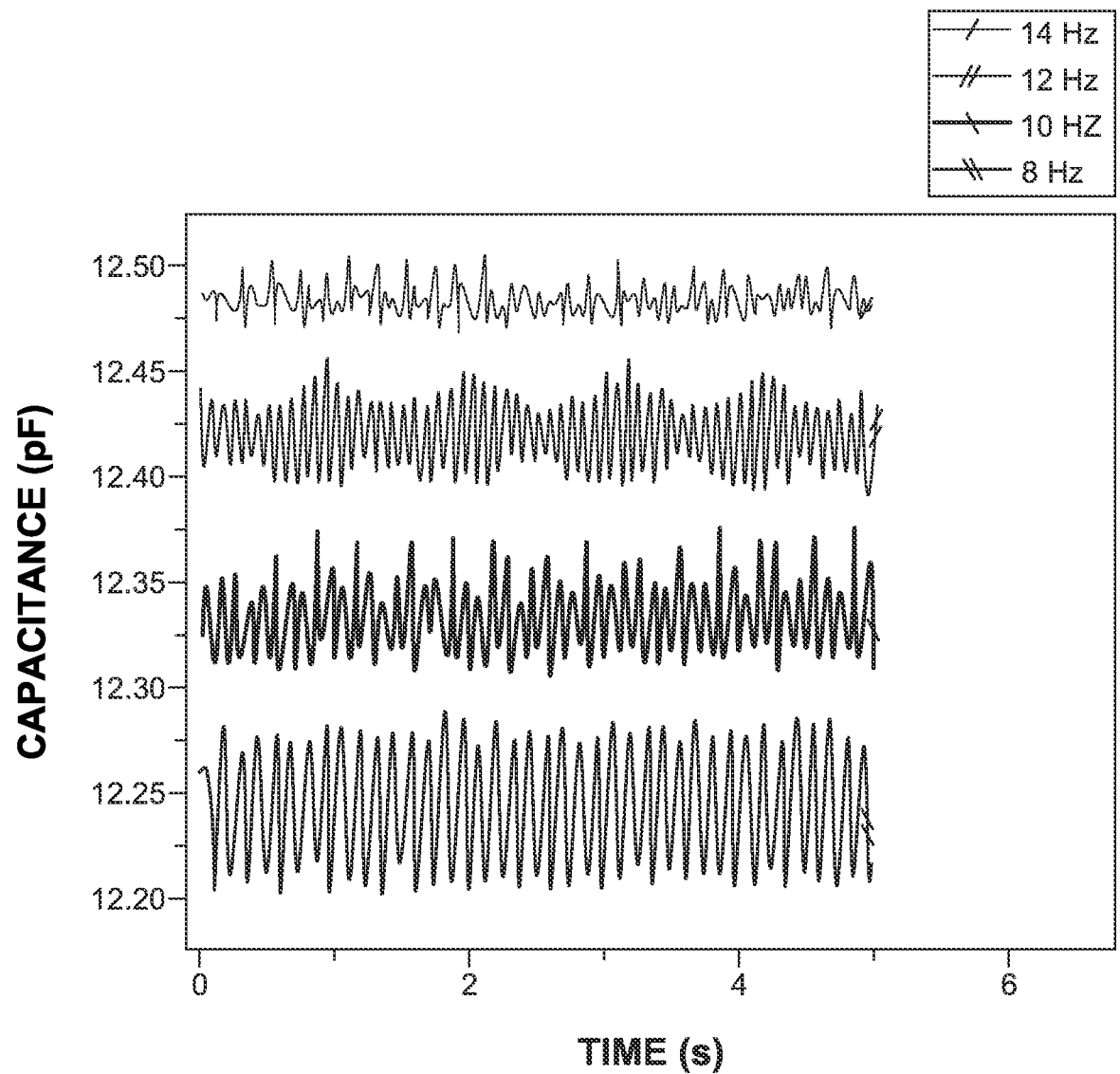
FIG. 10B illustrates the relation between the equivalent capacitance of the angular acceleration sensor and the time for various frequencies of the applied angular acceleration.
Figure 10C:
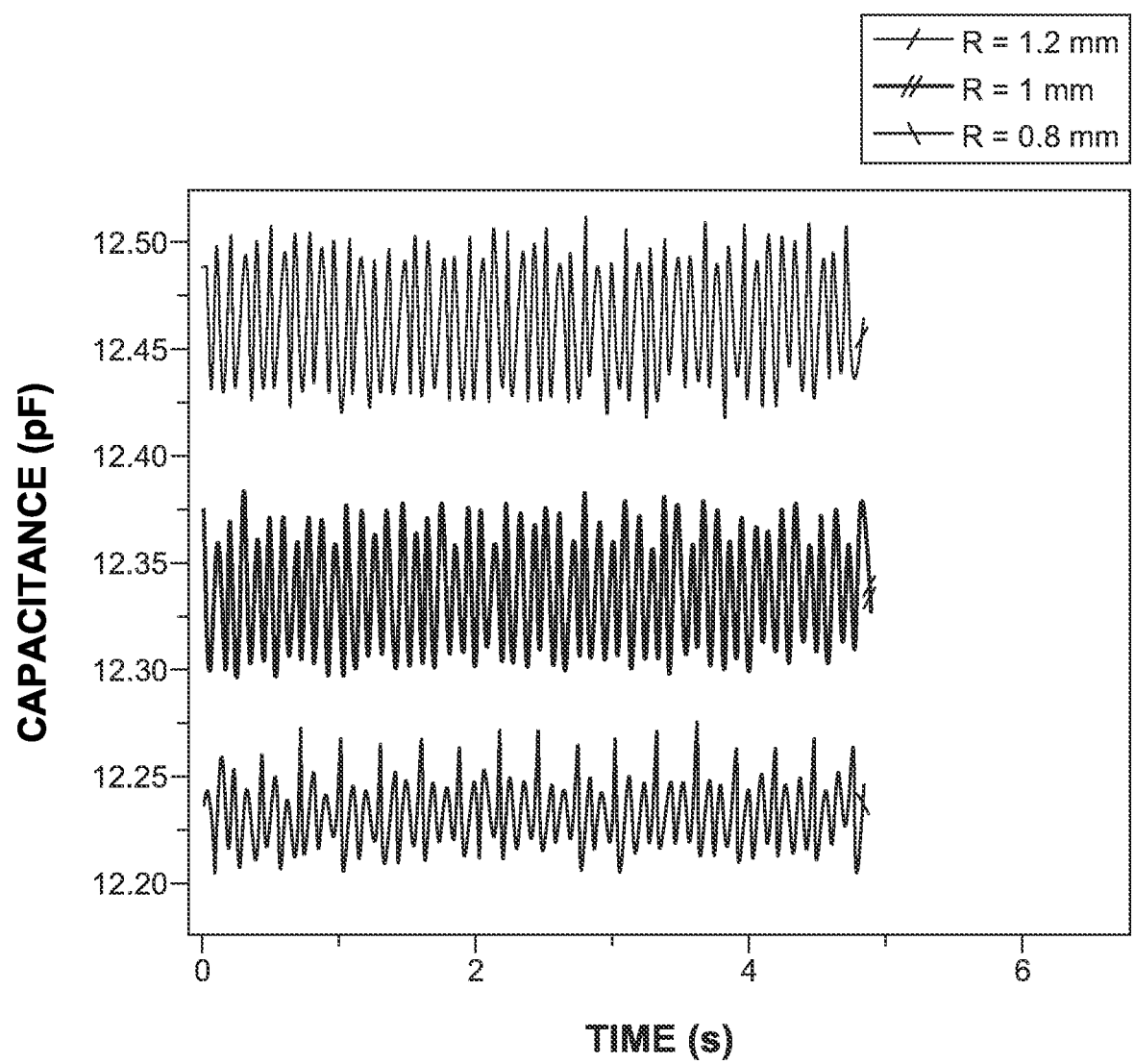

The oscillatory pattern in the capacitance variations as a result of the externally applied sinusoidal vibration can be observed in FIGS. 10A to 10C. At a fixed frequency of 10 Hz, the effect of the amplitude of the applied external acceleration is plotted in FIG. 10A. It can be observed that the peak to peak as well as the overall magnitude of the acceleration increases. This behavior can be explained by the expected dynamic behavior of the spherical proof mass, i.e., as the strength of the vibration increases, the mass is able to move to further angular distances along the channel 140, which results in larger overlapping areas between the spherical mass 130 and the varying-width second metallic layer 122. It is worth to mention that the sensor is able to detect acceleration patterns of applied acceleration amplitudes as low as 0.1 g.

The response of the sensor 100 when applying an acceleration with different frequencies was also investigated as seen in FIG. 10B. To optimize the performance of the device, spherical masses of different sizes were investigated, as illustrated in FIG. 10C. It can be observed from FIG. 10C that the larger the size of the spherical mass, the higher the capacitance change. This might seem counterintuitive as smaller and lighter spherical masses are expected to move faster and easier than a larger mass in response to the applied acceleration. However, this observed result can be understood if the unique proposed capacitive structure of the device, as shown in FIG. 2, is taken into account. The conductive spherical mass here is an active component that affects the capacitance change. A larger spherical mass induces larger distention in the electric field to its charge. This results in an increase in the magnitude of both the $C_1$ and $C_2$ in the system, resulting in an increase in the overall equivalent capacitance change. Thus, an advantage of the proposed acceleration design arises when the design complexity, power consumption, customizability and the overall cost of fabrication are considered.

The above embodiments detail the manufacturing and some advantages and capabilities of a novel 3D-printed angular accelerometer that uses a simplified capacitive sensing structure. The simplified capacitive sensing structure employs a conductive spherical mass that moves inside a channel defined by the plates of a capacitor, and the capacitance of the capacitor varies due to the varying width of one of the plates of the capacitor. The sensor offers an inexpensive way to capture acceleration profile of objects when an external angular acceleration is applied. The channel is made to be a semi-circular track in one embodiment. The combination of the semi-circular track structure and the novel electrode capacitive configuration allows for acceleration measurements to be captured using a singular reading, minimizing power consumption, and reducing the design and fabrication complexity.

Various sensor characteristics and its overall performance can be optimized by varying the physical parameters of the structure such as the radius of the conductive proof mass, the dielectric material used, and surface modification of the semi-circular track. These parameters can be tuned based on the intended application. A Bluetooth-enabled PSoC was integrated with the sensor in order to read and transfer captured acceleration data in real-time yielding a stand-alone system. The stand-alone system can be used in applications related to healthcare, ranging from macro human body motion monitoring to finer motion monitoring such as heart rate and respiration rate. Moreover, it can be used for consumer electronics, earthquake detection, and structural monitoring of buildings.

Figure 11:
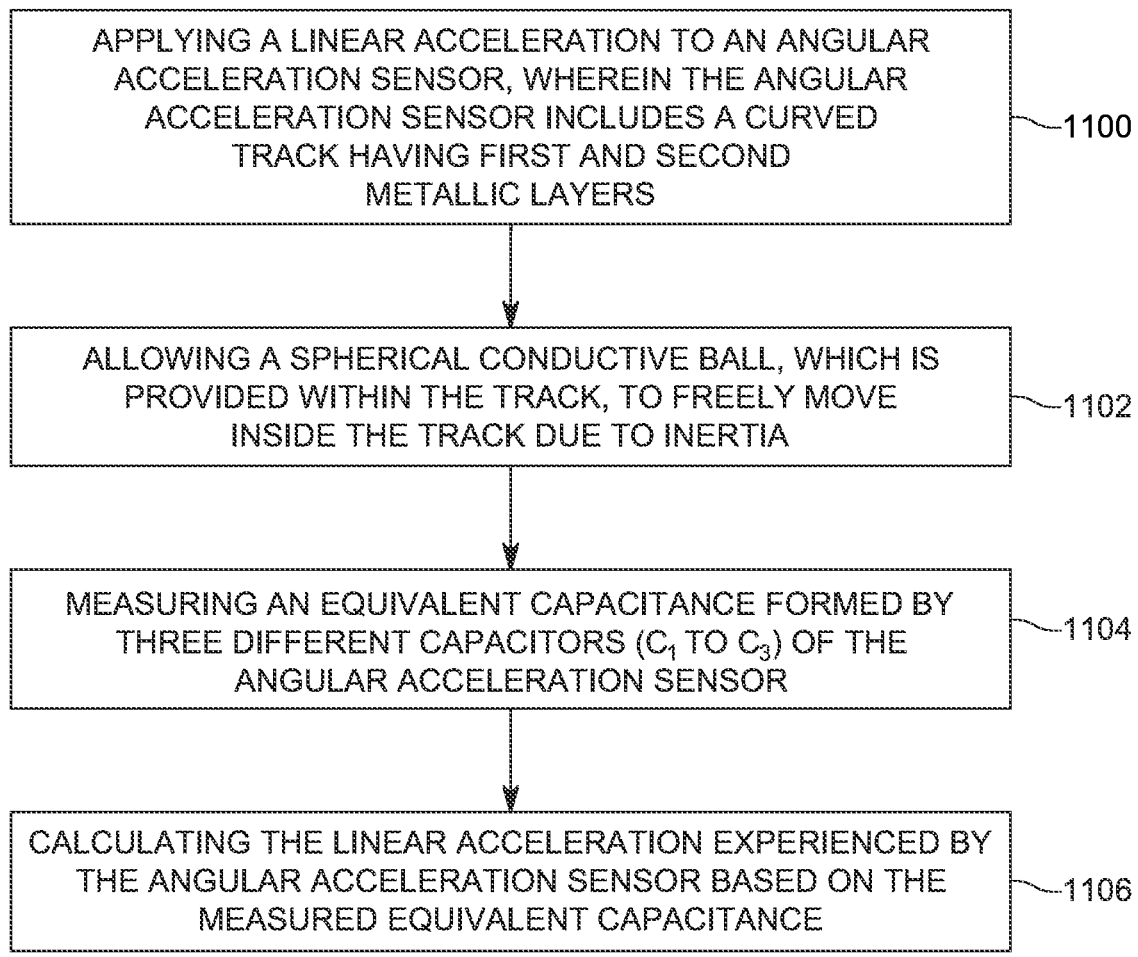
FIG. 11 is a flow chart of a method for measuring an angular acceleration of a body with the angular acceleration sensor of FIG. 4.

A method for determining a linear acceleration with the sensor 100 is now discussed with regard to FIG. 11. The method includes a step 1100 of applying the linear acceleration to the angular acceleration sensor 100, wherein the angular acceleration sensor includes a curved track having first and second metallic layers, a step 1102 of allowing a spherical conductive ball, which is provided within the track, to freely move inside the track due to inertia, a step 1104 of measuring an equivalent capacitance formed by three different capacitors (C1 to C3) of the angular acceleration sensor, and a step 1106 of calculating the linear acceleration experienced by the angular acceleration sensor based on the measured equivalent capacitance. The first metallic layer is associated with the second and third capacitors and has a constant, uniform, width along a length of the track while the second metallic layer is associated with the first and third capacitors and has a varying-width along the length of the track.

The disclosed embodiments provide an angular acceleration sensor that is sensitive to an external linear acceleration and can be made by using inexpensive materials and processing methods. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] H. Zeng and Y. Zhao, Appl. Phys. Lett. 96, 2008 (2010).
[2] U. Park, K. Yoo, and J. Kim, Sensors Actuators, A Phys. (2010).
[3] D. Won, M. Huh, S. Lee, U. Park, D. Yoo, and J. Kim, Adv. Electron. Mater. 1901265, 1 (2020).
[4] B. Zhang, L. Zhang, W. Deng, L. Jin, F. Chun, H. Pan, B. Gu, H. Zhang, Z. Lv, W. Yang, and Z. L. Wang, ACS Nano 11, 7440 (2017).
[5] V. Zega, M. Invernizzi, R. Bernasconi, F. Cuneo, G. Langfelder, L. Magagnin, M. Levi, and A. Corigliano, IEEE Sens. J. 19, 9131 (2019).

What is claimed is:

1. An angular acceleration sensor comprising:
   a curved track having first and second metallic layers; and
   a spherical conductive ball provided within the track,
   wherein the first metallic layer has a constant, uniform, width along a length of the track while the second metallic layer has a varying-width along the length of the track, and
   wherein an angular acceleration experienced by the spherical conductive ball is associated with a change in a capacitance between the spherical conductive ball and the curved track, which is uniquely associated with an external linear acceleration experienced by the sensor.

2. The sensor of claim 1, wherein the curved track is semi-circular.

3. The sensor of claim 1, wherein the curved track comprises:
   a first curved plate; and
   a second curved plate, positioned opposite to the first curve plate so that the first and second curved plates are concentric to each other.

4. The sensor of claim 3, wherein the curved track further comprises:
   a base that connects a first side of the first curved plate to a first side of the second plate; and
   a cover that connects a second side of the first curved plate to a second side of the second plate.

5. The sensor of claim 3, wherein the first curved plate comprises:
   a first support layer made of an insulator material;
   the first metallic layer formed over the first support layer; and
   a first dielectric layer formed over the first metallic layer.

6. The sensor of claim 5, wherein the second curved plate comprises:
   a second support layer made of an insulator material;
   the second metallic layer formed over the second support layer; and
   a second dielectric layer formed over the second metallic layer.

7. The sensor of claim 6, wherein a distance d between an internal face of the first dielectric layer and an internal face of the second dielectric layer is larger than a diameter of the spherical conductive ball so that the spherical conductive ball moves freely inside the track.

8. The sensor of claim 6, wherein the spherical conductive ball, the first dielectric layer and the first metallic layer form a first capacitor C1, the spherical conductive ball, a layer of air, the second dielectric layer, and the second metallic layer form a second capacitor C2, and the first metallic layer, the first dielectric layer, another layer of air, the second dielectric layer, and the second metallic layer form a third capacitor C3.

9. The sensor of claim 8, wherein a capacitance of the first capacitor changes as the spherical mass moves along the length of the track so that each angular acceleration of the spherical mass within the track is associated with a unique equivalent capacitance of the track.

10. The sensor of claim 9, wherein the equivalent capacitance is equal to connecting the first and second capacitors in series and also connecting the third capacitor, in parallel, to the series connected first and second capacitors.

11. The sensor of claim 1, further comprising:
    a processing and communication unit electrically connected to the first and second metallic layers and configured to read an equivalent capacitance formed by (1) the first metallic layer and the spherical conductive ball, (2) the second metallic layer and the spherical conductive ball, and (3) the first and second metallic layers.

12. The sensor of claim 11, further comprising:
    a power supply configured to supply power to the processing and communication unit.

13. The sensor of claim 12, further comprising:
    a base that is part of the track, wherein the processing and communication unit and the power supply are located on the base.

14. An acceleration measuring system comprising:
    an angular acceleration sensor configured to measure a linear acceleration; a processing and communication unit electrically connected to the angular acceleration sensor and configured to read an equivalent capacitance of three different capacitors (C1 to C3) of the angular acceleration sensor; and
    a power supply configured to supply power to the processing and communication unit,
    wherein the sensor comprises:
    a curved track having first and second metallic layers; and
    a spherical conductive ball provided within the track,
    wherein the first metallic layer has a constant, uniform, width along a length of the track while the second metallic layer has a varying-width along the length of the track.

15. The system of claim 14, wherein the processing and communication unit is configured to transmit to an external device a change in the equivalent capacitance.

16. The system of claim 14, wherein the curved track comprises:
    a first curved plate;
    a second curved plate, positioned opposite to the first curve plate so that the first and second curved plates are concentric to each other;
    a base that connects a first side of the first curved plate to a first side of the second plate; and
    a cover that connects a second side of the first curved plate to a second side of the second plate.

17. The system of claim 14, wherein the spherical conductive ball, a first dielectric layer formed on the first metallic layer, and the first metallic layer form the first capacitor C1, the spherical conductive ball, a layer of air, a second dielectric layer formed on the second metallic layer, and the second metallic layer form the second capacitor C2, and the first metallic layer, the first dielectric layer, another layer of air, the second dielectric layer, and the second metallic layer form the third capacitor C3.

18. The system of claim 17, wherein a capacitance of the first capacitor changes as the spherical mass moves along the length of the track so that each angular acceleration of the spherical mass within the track is associated with a unique equivalent capacitance of the sensor.

19. A method for determining a linear acceleration, the method comprising:
applying a linear acceleration to an angular acceleration sensor, wherein the angular acceleration sensor includes a curved track having first and second metallic layers;
allowing a spherical conductive ball, which is provided within the track, to freely move inside the track due to inertia;
measuring an equivalent capacitance formed by three different capacitors (C1 to C3) of the angular acceleration sensor; and
calculating the linear acceleration experienced by the angular acceleration sensor based on the measured equivalent capacitance,
wherein the first metallic layer associated with the second and third capacitors has a constant, uniform, width along a length of the track while the second metallic layer associated with the first and third capacitors has a varying-width along the length of the track.

* * * * *